United States Patent [19]
Chen

[11] Patent Number: 5,870,288
[45] Date of Patent: Feb. 9, 1999

[54] FIXING LATCH MEMBER FOR HEAT RADIATING BOARD OF CENTRAL PROCESS UNIT

[75] Inventor: Wei Chen, Taipei Hsien, Taiwan

[73] Assignee: Hoya Tech Co., Ltd., Taipei Hsien, Taiwan

[21] Appl. No.: 957,022

[22] Filed: Oct. 24, 1997

[51] Int. Cl.⁶ .................................................. H05K 7/20
[52] U.S. Cl. ......................... 361/704; 165/80.3; 165/185; 174/16.3; 257/718
[58] Field of Search ................................. 165/80.2, 80.3, 165/185; 174/16.3; 257/706, 707, 712, 713, 718, 719, 722, 726, 727; 361/697, 704, 707, 709–710

[56] References Cited

U.S. PATENT DOCUMENTS

| | | | |
|---|---|---|---|
| 5,241,453 | 8/1993 | Bright et al. | 361/704 |
| 5,617,292 | 4/1997 | Steiner | 361/704 |
| 5,664,624 | 9/1997 | Tsai et al. | 361/697 |
| 5,708,564 | 1/1998 | Lin | 361/704 |
| 5,724,228 | 3/1998 | Lee | 361/697 |
| 5,755,276 | 5/1998 | Chiou | 361/704 |
| 5,771,153 | 6/1998 | Sheng | 361/697 |
| 5,771,155 | 6/1998 | Cook | 361/710 |

*Primary Examiner*—Gregory D. Thompson
*Attorney, Agent, or Firm*—Rosenberg, Klein & Bilker

[57] ABSTRACT

A fixing latch member for heat radiating board of CPU, including two latch boards, two linking levers and a controlling lever. Two ends of each latch board are respectively formed with a first and a second latch sections. The linking lever is passed through the latch board. A first end of the linking lever is hooked with the first latch section of the latch board. A second end thereof is formed with a connecting plate section having a locating hole and passed through the second latch section. Each end of the controlling lever is formed with an outward extending driving section fitted in the locating hole of the linking lever. The second latch section of the latch board resiliently abuts against the bottom of the driving section. By means of rotating the controlling lever, the driving sections thereof are rotated within the locating holes of the linking levers. At this time, the driving sections simultaneously downward press the second latch sections and lift the linking levers and drivingly lift the first latch sections, whereby the first and second latch sections are inward retracted toward each other so as to tightly latch the heat radiating board on the CPU.

6 Claims, 5 Drawing Sheets

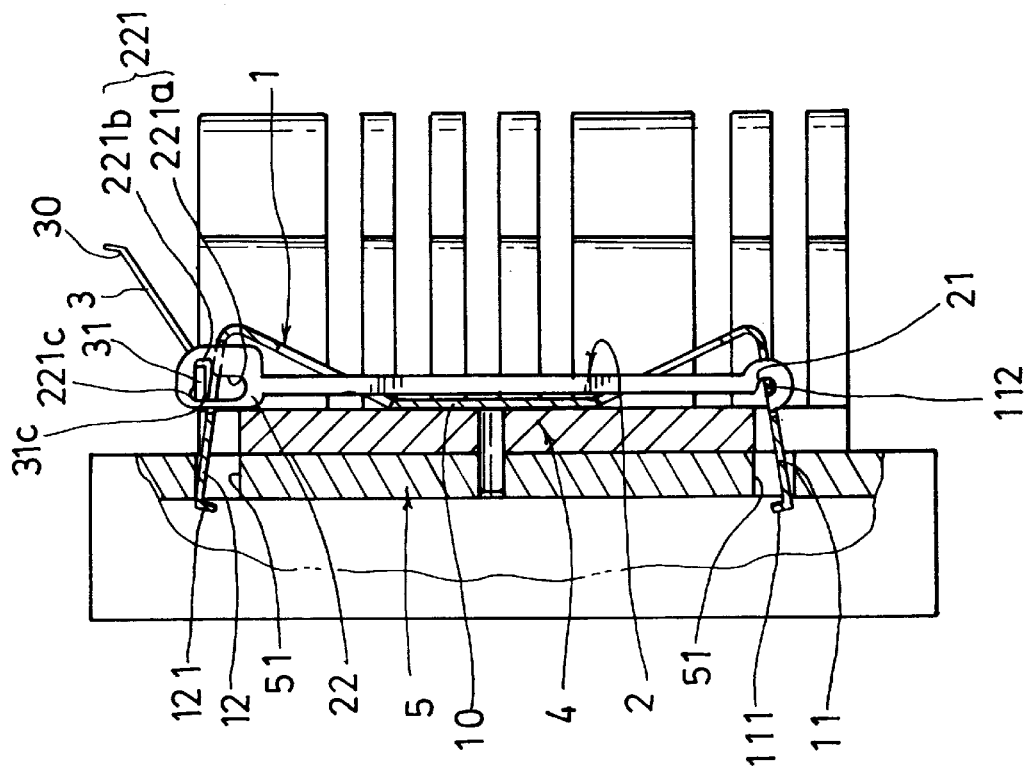
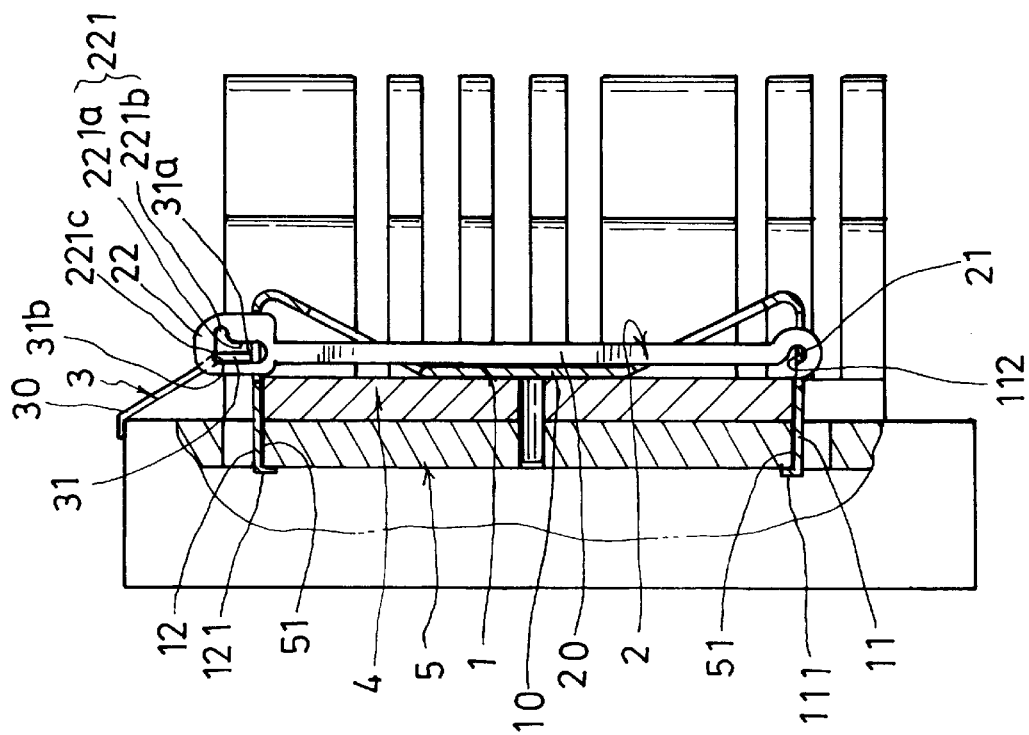

FIXING LATCH MEMBER FOR HEAT RADIATING BOARD OF CENTRAL PROCESS UNIT

BACKGROUND OF THE INVENTION

The present invention relates to a fixing latch member for heat radiating board of Central Process Unit (CPU), and more particularly to a fixing latch member for heat radiating board of Pentium II CPU produced by Intel (Intel is a trade mark of Intel Corporation.)

It is known that the old CPU has been replaced by the Pentium II CPU developed by Intel. The electronic chips in the CPU often suffer high temperature after a period of execution. This will affect the processing speed of CPU or even lead to damage thereof. In order to obviate this problem, a heat radiating board is mounted on a lateral side of Pentium II CPU and a radiating fan is installed on the heat radiating board so as to enhance the heat radiating efficiency of the CPU. The heat radiating board is generally installed in such a manner that two metal latch plates made by integral punching are used to secure the heat radiating board on the CPU. Such measure has several shortcomings as follows:

1. The two metal latch plates are separate components so that it is necessary to secure the latch plates one by one.
2. The metal latch plate has great resilient strength and narrow width so that it is strength-consuming to secure the latch plate on the CPU. Also, in installation, the user often has a painful feeling at his fingers.
3. When unlatching the latch plate from the CPU, a tool such as screwdriver must be used to pry up one side of the latch plate. This often results in injury of the user.
4. The metal latch plate often drops down due to shocking force in transferring.

SUMMARY OF THE INVENTION

It is therefore a primary object of the present invention to provide a fixing latch member for heat radiating board of CPU, including two latch boards, two linking levers and a controlling lever. Two ends of each latch board are respectively resiliently formed with a first and a second latch sections. The linking lever is passed through the latch board. A first end of the linking lever is hooked with the first latch section of the latch board. A second end thereof is formed with a connecting plate section having a locating hole and passed through the second latch section. Each end of the controlling lever is formed with an outward extending driving section fitted in the locating hole of the linking lever. The second latch section of the latch board resiliently abuts against the bottom of the driving section. The latch boards can fixedly ride over a heat radiating board which is attached to one side of a CPU. The first and second latch sections of the latch board are respectively fitted into the latch holes of a lateral board of the CPU. Thereafter, the controlling lever is driven, making the driving sections thereof rotated within the locating holes of the linking levers. At this time, the driving sections simultaneously downward press the second latch sections and lift the linking levers and drivingly lift the first latch sections so that the first and second latch sections are simultaneously inward retracted toward each other so as to tightly latch the heat radiating board on the CPU. By means of rotating the controlling lever, the heat radiating board can be installed on or detached from the CPU without using any tool.

The present invention can be best understood through the following description and accompanying drawings, wherein:

BRIEF DESCRIPTION OF THE DRAWINGS

FIG. 6 is a sectional view taken along line 6—6 of FIG. 5; and

FIG. 7 is a view according to FIG. 6, showing the heat radiating board is unlatched from the CPU.

DETAILED DESCRIPTION OF THE PREFERRED EMBODIMENT

Figure 1:
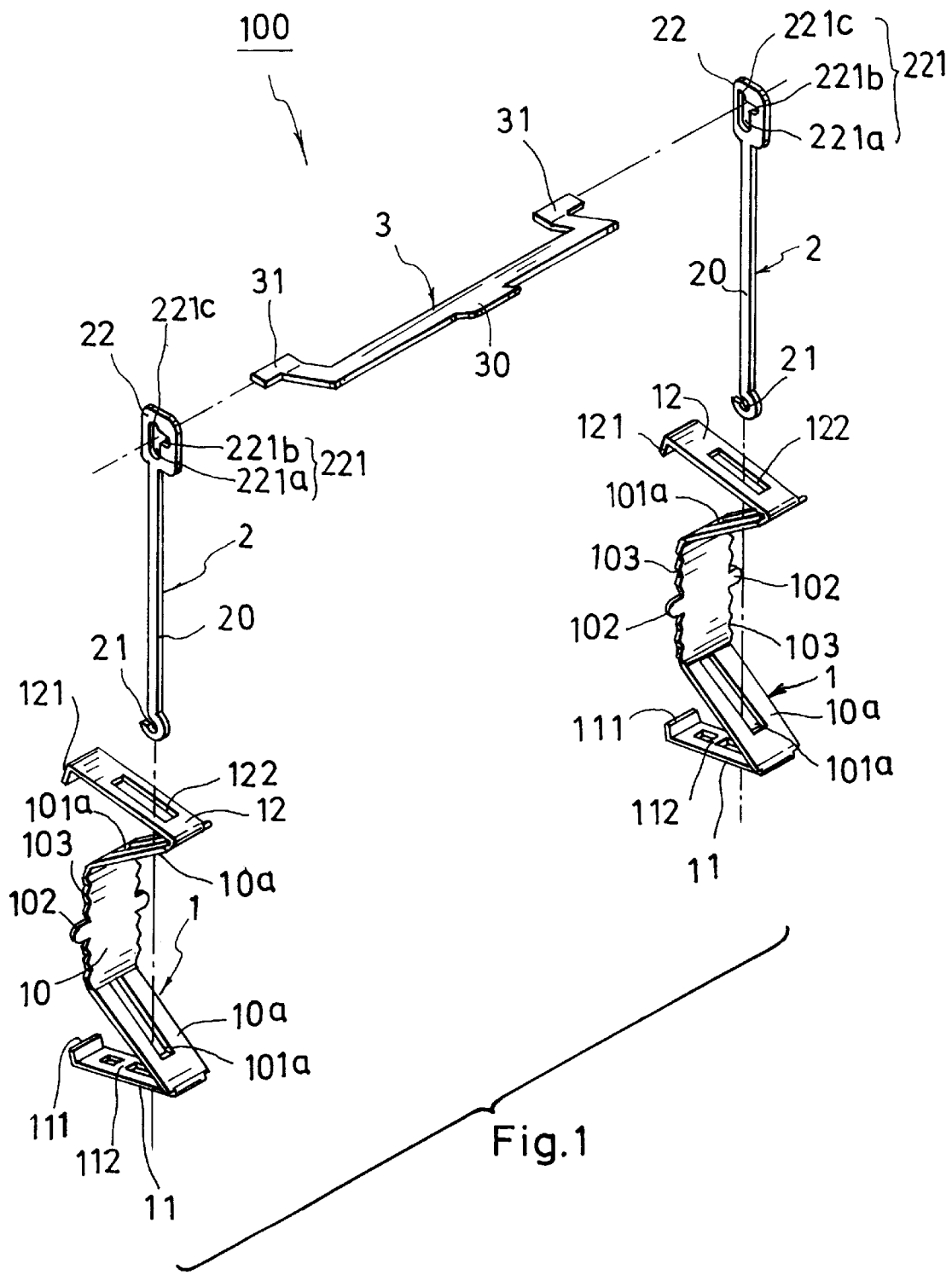
FIG. 1 is a perspective exploded view of the present invention.

Please refer to FIGS. 1 to 7. The fixing latch member 100 of the present invention includes two latch boards 1, two linking levers 2 and a controlling lever 3. Two ends of each latch board 1 are respectively formed with a first and a second latch sections 11, 12. The linking lever 2 is passed through the latch board 1. A first end of the linking lever 2 is hooked with the first latch section 11 of the latch board 1. A second end thereof is formed with a locating hole 221. Each end of the controlling lever 3 is formed with an outward extending driving section 31 fitted in the locating hole 221 of the linking lever 2. The second latch section 12 of the latch board 1 resiliently abuts against the bottom of the driving section 31. According to the above arrangement, the latch boards 1 can fixedly ride over a heat radiating board 4 which is attached to one side of a CPU 5. The first and second latch sections 11, 12 of the latch board 1 are respectively fitted into the latch holes 51 of a lateral board of the CPU 5. Thereafter, the controlling lever 3 is driven, making the driving sections 31 thereof rotated within the locating holes 221 of the linking levers. At this time, the driving sections 31 simultaneously inward retract the first and second latch sections 11, 12 opposite to each other so as to tightly latch the heat radiating board 4 on the CPU 5.

Figure 2:
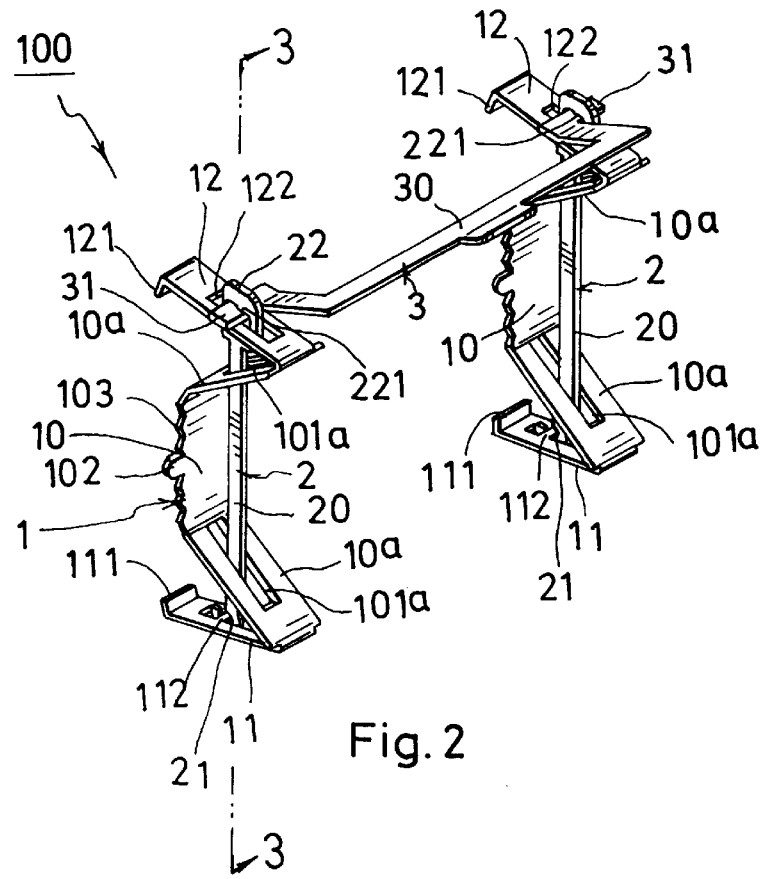
FIG. 2 is a perspective assembled view of the present invention.
Figure 3:
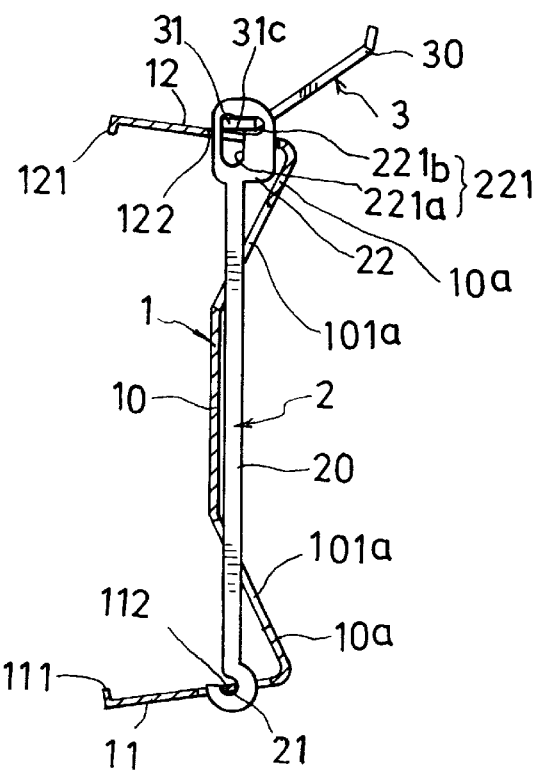
FIG. 3 is a sectional view taken along line 3—3 of FIG. 2.

Referring to FIGS. 1 to 3, the latch board 1 is integrally made from a metal board material by punching, including a middle supporting panel section 10. A resilient arm 10a inclinedly extends from each end of the supporting panel section 10. Each resilient arm 10a is formed with a slot 101a aligned with the other. The first latch section 11 extends from the end of the resilient arm 10a of first end of the latch board 1 in a bent pattern. The end of the first latch section 11 is upward bent to form a hook section 111. The first latch section 11 is formed with two holes separated from each other by a bridge section 112. The second latch section 12 extends from the end of the resilient arm 10a of second end of the latch board 1 in a bent pattern. The end of the second latch section 12 is downward bent to form a hook section 121. The second latch section 12 is formed with a slot 122 aligned with the slots 101a of the resilient arms 10a, whereby a linking lever 2 can be passed therethrough.

Figure 5:
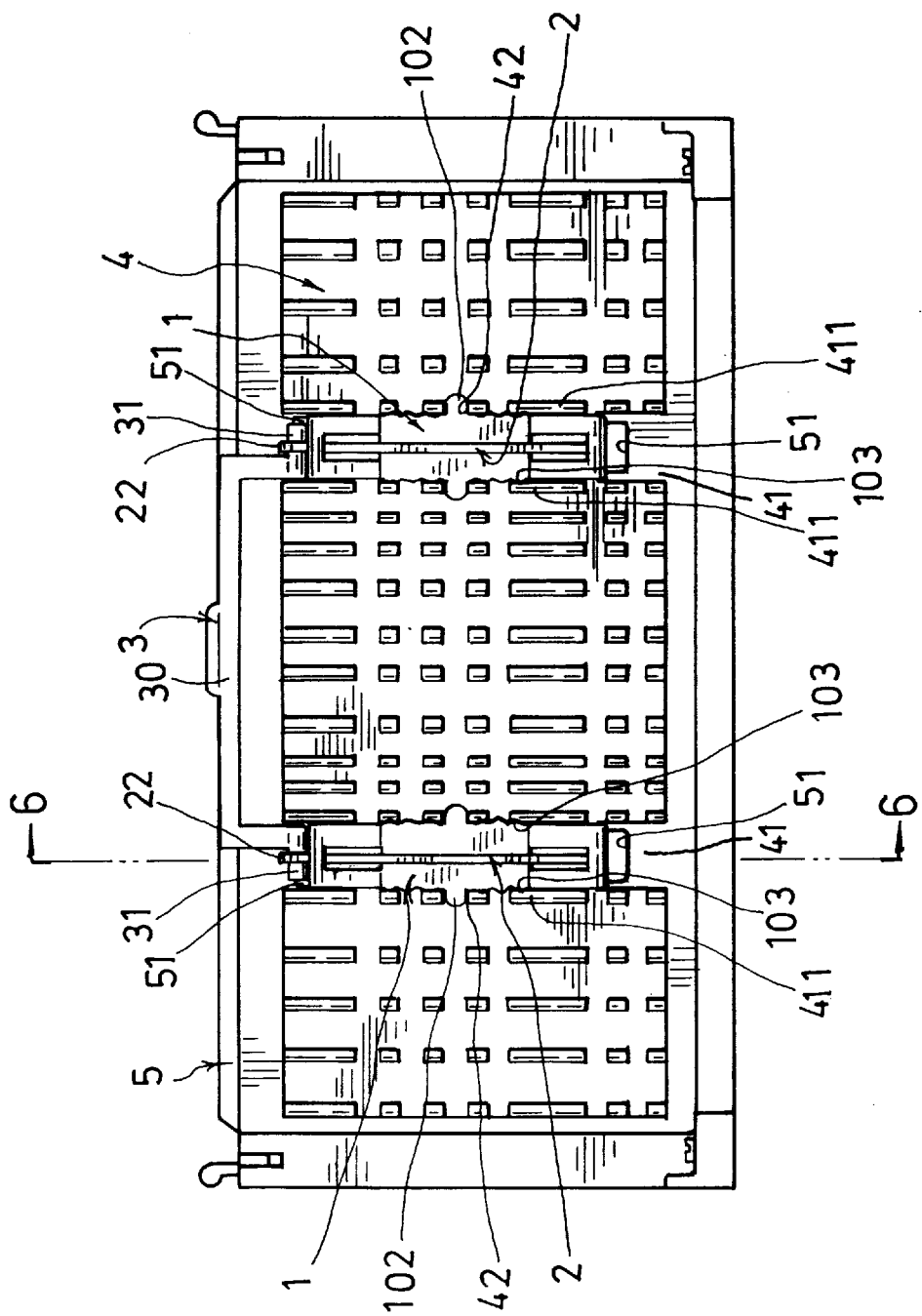
FIG. 5 is a plane view showing that the heat radiating board is secured on the CPU by the present invention.

At least one locating vane 102 laterally extends from lateral side of the supporting panel section 10, whereby when the latch board 1 rides in a channel 41 of the heat radiating board 4 as shown in FIG. 5, the locating vane 102 is snugly passed through a transverse channel 42 of the heat radiating board 4, preventing the latch board 1 from vertically sliding on the heat radiating board 4. Moreover, the lateral sides of the supporting panel section 10 can be additionally disposed with multiple locating teeth 103, whereby when the latch board 1 rides in the channel 41 of the heat radiating board 4, the locating teeth 103 are tightly retained on wall faces of the lateral heat radiating fin plates 411 of the channel 41, preventing the latch board 1 from detaching from the heat radiating board 4 due to external shocking force.

Referring to FIGS. 1 to 3, the linking lever 2 includes an elongated lever body 20 having a first end formed with a hook 21. After the lever body 20 is passed through the slot 122 of the second latch section 12 and the slots 101a of the resilient arms 10a, the hook 21 of the linking lever 2 is hooked with the bridge section 112 of the first latch section 11 of the latch board 1. A second end of the linking lever 2 is disposed with a connecting plate section 22 formed with a locating hole 221 in which the driving section 31 of the controlling lever 3 is rotatably positioned. The locating hole 221 includes a longitudinal notch 221a and a transverse notch 221b communicated with the longitudinal notch 221a.

The controlling lever 3 includes a handle section 30 and two driving sections 31 outward extending from two sides of the handle section 30 for fitting into the locating holes 221 of the linking levers 2. The second latch section 12 of the latch board 1 abuts against the bottom of the driving section 31 as shown in FIGS. 2 and 3.

Figure 4:
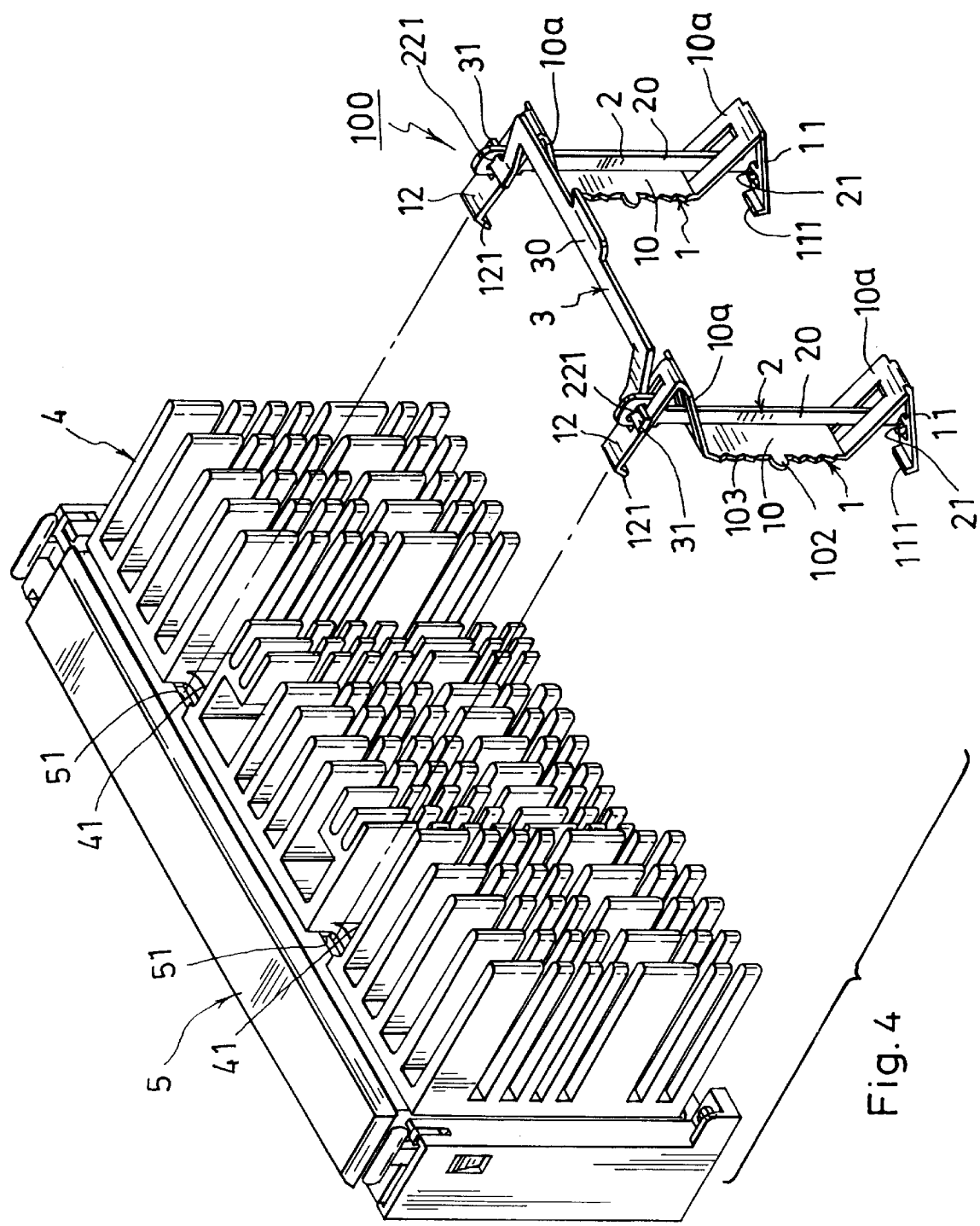
FIG. 4 shows that the heat radiating board is to be installed on a CPU.

As shown in FIGS. 2 and 3, after the components are assembled into the fixing latch member 100, the first latch section 11 of the latch board 1 is hooked by the hook 21 of the linking lever 2. The second latch section 12 resiliently abuts against the bottom of the driving section 31 of the controlling lever 3. Accordingly, as shown in FIGS. 4 and 5, the latch boards 1 respectively ride in the channels 41 of the heat radiating board 4 with the heat radiating board 4 attaching to the outer side of the CPU 5. Also, the first and second latch sections 11, 12 are respectively aligned with and fitted in the latch holes 51 of the CPU 5 as shown in FIG. 7. At this time, a user can upward rotate the controlling lever 3, making the driving sections 31 thereof rotated within the locating holes 221 of the linking levers 2. Referring to FIG. 6, by means of rotating the handle section 30, the driving sections 31 is positioned in the longitudinal notch 221a of the locating hole 221 in an upright state. At this time, the bottom edge 31a of the driving section 31 downward presses the second latch section 12. Simultaneously, the top edge 31b of the driving section 31 upward abuts against the upper wall of the locating hole 221 of the linking lever 2. Therefore, the hook 21 of the linking lever 2 upward pulls the first latch section 11 of the latch board 1, that is, the first and second latch sections 11, 12 are simultaneously inward retracted. As a result, the hook section 111 of the first latch section 11 and the hook section 121 of the second latch section 12 are tightly latched with the inner edges of the latch holes 51 of the CPU 5 so as to firmly secure the heat radiating board 4 on the lateral side of the CPU 5.

As shown in FIGS. 1, 3 and 6, the upper edge of the locating hole 221 of the linking lever 2 is further formed with a recess 221c, whereby when the driving section 31 of the controlling lever 3 is rotated into an upright state, the driving section 31 is upward resiliently pushed by the second latch section 12, making the top edge 31b engaged in the recess 221c. Therefore, the driving section 31 is prevented from being changed from the upright state due to external force.

When taking off the heat radiating board 4, the controlling lever 3 is downward rotated, whereby the driving sections 31 are moved from upright state into horizontal state and positioned in the transverse notch 221b of the locating hole 221 as shown in FIG. 7. At this time, the second latch section 12 upward resiliently abuts against lower side of lateral edge 31c of the driving section 31. Also, the first latch section 11 is downward resiliently stretched, whereby the hook sections 111, 121 of the first and second latch sections 11, 12 are unlatched from the latch holes 51 of the CPU 5 so as to take off the heat radiating board 4.

The present invention has the following advantages:
1. By means of the controlling lever, two latch boards are simultaneously controlled to latch the heat radiating board with or unlatch the heat radiating board from the CPU. The installation or detachment can be easily and quickly performed.
2. The installation or detachment can be done without using any tool.
3. The controlling lever can be rotated to control the latching/unlatching state of the latch boards so as to save strength and avoid painful feeling of a user's fingers.
4. The installation or detachment can be done without using any tool so that a user is protected from being injured.
5. The heat radiating board is prevented from dropping down due to shocking force in transferring.

It is to be understood that the above description and drawings are only used for illustrating one embodiment of the present invention, not intended to limit the scope thereof. Any variation and derivation from the above description and drawings should be included in the scope of the present invention.

What is claimed is:
1. A fixing latch member for securing a heat radiating board for a central processing unit, comprising:
 (a) two latch boards, each latch board including:
  a middle supporting panel section having first and second ends;
  a first resilient arm projecting from the first end of the supporting panel section;
  a second resilient arm projecting from the second end of the supporting panel section, the first and second resilient arms being formed respectively with slots aligned one with the other;
  a first latch section extending from an end of the first resilient arm, the first latch section terminating at an upwardly bent hook section; and,
  a second latch section extending from an end of the second resilient arm, the second latch section terminating at a downwardly bent hook section, the second latch section being formed with a slot aligned with the slots of the first and second resilient arms;
 (b) two linking levers, each linking lever including an elongated lever body passed through one of the latch boards, each linking lever having a first end adapted to hookingly engage the first latch section of one of the latch boards, and a second end formed with a connecting plate section passed through the slot of the second latch section, the connecting plate section having a locating hole formed therein; and,
 (c) a controlling lever including a handle section and two driving sections extending from opposed sides thereof for respective insert into the locating holes of the linking levers, the second latch sections of the latch boards abutting the controlling lever driving sections;
 the latch boards being adapted to respectively engage a heat radiating board disposed against an outer side of the central processing unit, the first and second latch sections being adapted respectively to align with and engage a plurality of latch holes in the central processing unit, whereby the controlling lever can be rotated to retract the first and second latch sections toward one another so as to firmly secure the heat radiating board on the central processing unit.

2. The fixing latch member as recited in claim 1, wherein each latch board includes at least one locating vane extending laterally from the supporting panel section thereof for engagement with a transverse channel of the heat radiating board.

3. The fixing latch member as recited in claim 1, wherein at least one of the supporting panel sections has formed thereon a plurality of locating teeth adapted to engage a lateral wall of the heat radiating board.

4. The fixing latch member as recited in claim 1, wherein the locating hole of each linking lever includes a longitudinal notch portion and a transverse notch portion, the longitudinal and transverse notch portions being in open communication one with the other.

5. A fixing latch member as recited in claim 4, wherein the locating hole of each linking lever includes an upper edge portion having a recess for engaging the driving section of the controlling lever in releasably locked manner.

6. The fixing latch member as recited in claim 1, wherein the first latch section of each latch board is formed with two holes separated by a bridge section for hooking engagement by the first end of one of the linking levers.

* * * * *